Patented Aug. 15, 1944

2,355,630

UNITED STATES PATENT OFFICE 2,355,630

PHOTOGRAPHIC EMULSION

Burt H. Carroll and John Spence, Rochester, N. Y., assignors to Eastman Kodak Company, Rochester, N. Y., a corporation of New Jersey No Drawing. Application January 20, 1943,
Serial No. 472,986

16 Claims. (Cl. 95—7)

This invention relates to sensitized photographic emulsions and more particularly to spectrally (optically) sensitized emulsions.

It is known that the distribution of spectral sensitivity of certain spectrally sensitized emulsions can be altered and an increase of sensitivity obtained in some spectral region, by incorporating certain additional sensitizing dyes in the spectrally sensitized emulsions. (See United States patents, 2,158,882, dated May 16, 1939, and 2,159,565, dated May 23, 1939.) The effect thus obtained has come to be known as supersensitization. Supersensitization of certain spectrally sensitized emulsions can also be effected by incorporating certain substantially colorless heterocyclic bases in the spectrally sensitized emulsions. (See United States Patent 2,177,635, dated October 31, 1939.) Supersensitization differs from hypersensitization which involves treatment of finished film of plates, an operation which normally reduces the pAg and increases the pH of the emulsions with consequent decreased stability.

We have now found a new method for supersensitizing spectrally sensitized emulsions, which not only does not reduce the stability of the emulsions, but is especially valuable as a means of giving panchromatic sensitized emulsions of high speed and exceptionally good color balance.

It is, accordingly, an object of our invention to provide new supersensitized photographic emulsions. A further object is to provide a process for preparing such emulsions. Still other objects will become apparent hereinafter.

In accordance with the invention, a photographic silver halide emulsion spectrally sensitized with a cyanine dye is supersensitized by incorporating in the emulsion an alkoxy aromatic aldehyde of the following general formula:

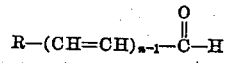

wherein $n$ represents a positive integer of from one to two and R represents an aromatic nucleus carrying at least one alkoxy group on the nucleus. The aromatic nucleus may carry simple substituents in addition to the alkoxy group. Those aldehydes in which R represents an aromatic nucleus of the benzene series which carries at least one alkoxy group on the nucleus are advantageously employed. The following are exemplary of the alkoxy aromatic aldehydes:

o-Methoxybenzaldehyde
Anisaldehyde
Dimethoxybenzaldehydes
o- and p-Alkoxycinnamaldehydes
p-Ethoxybenzaldehyde
Piperonal Practically all of the alkoxy aromatic aldehydes which supersensitize in accordance with the invention fall within a definite range of solubility in gelatin. For this purpose, solubility is defined by the appearance of optical homogeneity in gelatin sheets containing the alkoxy aromatic aldehyde. The solubility determination can be carried out as follows. The alkoxy aromatic aldehyde, dissolved in the minimum amount of methyl or ethyl alcohol or acetone, is added to an aqueous gelatin solution (70 g. of gelatin per 1000 cc. of water) and the resulting dispersion is coated on a glass plate. When dry, the coated plate is examined for optical homogeneity. The effective alkoxy aromatic aldehydes all give practically homogeneous gels in concentrations of from about 7 to about 20 grams of aldhyde per 100 grams of gelatin. Outside this range of concentration, the efficacy of the alkoxy aromatic aldehydes falls off very rapidly.

The majority of cyanine dyes which are supersensitized by the alkoxy aromatic aldehydes are characterized by the fact that the dyes produce two types of sensitization depending upon conditions. Such different types of sensitization are described by Leermakers, Carroll and Staud, J. Chem. Physics, 5, 878 (1937) and by G. Schwarz,—Sci. et Ind. Phot. 10, 233 (1939). When certain dyes of this type are used as sensitizers in low concentration, they exhibit a sensitizing maximum displaced about 20 to 50 mu toward the red from the absorption maximum in ethyl alcohol solution. On increasing the concentration of the dye, or upon digesting the emulsion containing the dye in the lower concentration, or both, a second maximum of sensitization develops at longer wavelengths, which may be accompanied by an increase in total optical sensitization. In some cases a decrease in sensitivity at the first maximum can be detected. These phenomena are consistent with the hypothesis of two states of the sensitizing dye in an equilibrium which is controlled by concentration. The alkoxy aromatic aldehydes favor the formation of a second maximum. The increase in sensitivity apparently corresponds to increased conversion of the dye to the state corresponding to the second maximum of sensitization. In some cases the effect appears to correspond to a more complete conversion than has ever been obtained without a supersensitizer and in any case the long wavelength sensitivity is better than can be obtained from the same concentration of dye without the alkoxy aromatic aldehydes.

The following are exemplary of the cyanine dyes which can be supersensitized in accordance with our invention:

3,3',9-triethylthiacarbocyanine (iodide)
3,3'-diethyl-9-methylthiacarbocyanine (bromide)
3,3'-diethyl-9-methylselenacarbocyanine (bromide)
3,3'-diethyl-9-methyl-4,5,4',5'- dibenzthiacarbocyanine (chloride)
3,3'-dimethyl-9-ethyl - 4,5,4',5'- dibenzthiacarbocyanine (chloride)
3,3',9 - triethyl - 4,5,4',5'- dibenzthiacarbocyanine (chloride)
3,3'-diethyl-9-phenyl-4,5,4',5'- dibenzthiacarbocyanine (chloride)
3,3',9 - triethyl - 5,5' - dichlorothiacarbocyanine (bromide)
3,3'-diethyl-9-methyl-5,5'- dichlorothiacarbocyanine (bromide)
3,3'-dimethyl-9- ethyl - 5,5'- dichlorothiacarbocyanine (bromide)
1,1'-diethyl-2,2'-cyanine (iodide)
3,1'-diethyl-4,5-benzthia-2'-cyanine (bromide)
2,1'-diethyl-6'-methoxythia-2'-cyanine (iodide)

The sensitizing dyes can be employed in any desired concentration. Ordinarily from 10 to 30 mg. of dye per liter of emulsion will suffice to produce the optimum sensitizing effect. The methods of incorporating sensitizing dyes in emulsions is well known to those skilled in the art. Ordinarily, it is preferable to dissolve the dye in a water-miscible solvent, such as methanol, before incorporating in the emulsion. Acetone may be used when the solubility of the dye in methanol is very low.

The amount of the alkoxy aromatic aldehyde employed is not critical. Usually the full supersensitizing effect is developed at a concentration of from 1 to 2 grams per liter of emulsion, but amounts up to the point where the aldehyde separates out on drying the emulsion can be used without bad effects; that may be 10 or more grams per liter of emulsion. The alkoxy aromatic aldehydes can be added with, before, or after the sensitizing dye or dyes. The alkoxy aromatic aldehydes are preferably, but not necessarily, diluted with a water-miscible solvent, such as methanol, before incorporation in the emulsion. One or more alkoxy aromatic aldehydes and one or more sensitizing dyes can be employed.

The following examples serve to illustrate results obtained in accordance with our invention:

*Example 1.*—A fast negative gelatino-silverbromiodide developing-out emulsion was sensitized with 3,3'-diethyl-9-methylselenacarbocyanine bromide (20 mg. per liter of emulsion) and to the spectrally sensitized emulsion was added o-methoxybenzaldehyde. A portion of spectrally sensitized emulsion was exposed without, and another portion with the addition of the aldehyde, through red (Wratten 25) and minus blue (Wratten 12) filters, the latter giving a good measure of total optical sensitization.

| o-Methoxybenzaldehyde (g. per liter of emulsion) | Red | | Minus blue | | Fog |
|---|---|---|---|---|---|
| | Speed | Gamma | Speed | Gamma | |
| None | 120 | 1.50 | 630 | 1.49 | .04 |
| 2.5 | 325 | 1.10 | 740 | 1.28 | .04 |

*Example 2.*—Another fast negative gelatino-silver-bromiodide developing-out emulsion was sensitized with 3,3'-diethyl-9-methylselenacarbocyanine bromide (20 mg. per liter of emulsion), and to the spectrally sensitized emulsion was added 2,3-dimethoxybenzaldehyde. A portion of spectrally sensitized emulsion was exposed without, and another portion with the addition of the aldehyde, through red (Wratten 25) and minus blue (Wratten 12) filters, the latter giving a good measure of total optical sensitization.

| 2,3-dimethoxybenzaldehyde (g. per liter of emulsion) | Red | | Minus blue | | Fog |
|---|---|---|---|---|---|
| | Speed | Gamma | Speed | Gamma | |
| None | 40 | 1.59 | 295 | 1.63 | .05 |
| 1.25 | 105 | 1.40 | 630 | 1.35 | .05 |

*Example 3.*—A fast negative gelatino-silverbromiodide developing-out emulsion was sensitized with 3,6'-dimethyl-1'-ethyl-4-phenyl-thiazolo-2'-cyanine iodide (20 mg. per liter of emulsion) and to the spectrally sensitized emulsion was added o-methoxybenzaldehyde. A portion of spectrally sensitized emulsion was exposed without, and another portion with the addition of the aldehyde, through a minus blue (Wratten 12) filter.

| o-Methoxybenzaldehyde (g. per liter of emulsion) | Minus blue | | Fog |
|---|---|---|---|
| | Speed | Gamma | |
| None | 51.8 | 1.76 | .08 |
| 1.25 | 69.0 | 1.57 | .05 |

*Example 4.*—A fast negative gelatino-silverbromiodide developing-out emulsion was sensitized with 3,3'-diethyl-9-methyl-4,5,4',5'-dibenzothiacarbocyanine bromide (20 mg. per liter of emulsion), and to the spectrally sensitized emulsion was added o-methoxybenzaldehyde. A portion of spectrally sensitized emulsion was exposed without, and another portion with the addition of the aldehyde, through red (Wratten 25) and minus blue (Wratten 12) filters.

| o-Methoxybenzaldehyde (g. per liter of emulsion) | Red | | Minus blue | | Fog |
|---|---|---|---|---|---|
| | Speed | Gamma | Speed | Gamma | |
| None | 58 | 1.78 | 220 | 1.74 | .05 |
| 1.25 | 80 | 1.78 | 179 | 1.78 | .05 |

We have also found that o-hydroxybenzaldehydes, e. g. salicyl aldehyde, have a supersensitizing effect similar to that of the alkoxy aromatic aldehydes. The effect obtained with salicyl aldehyde is very marked and in this respect quite different from the effect which its isomer p-benzaldehyde has under the same conditions. The following example will serve to illustrate the effect that can be obtained with salicyl aldehyde.

*Example 5.*—A fast negative gelatino-silverbromiodide developing-out emulsion was sensitized with 3,3'-diethyl-9-methylselenacarbocyanine bromide (20 mg. per liter of emulsion), and to the spectrally sensitized emulsion was added salicyl aldehyde. A portion of spectrally sensitized emulsion was exposed without, and another portion with the addition of the aldehyde, through red (Wratten 25) and minus blue (Wratten 12) filters.

| Salicyl aldehyde (g. per liter of emulsion) | Red | | Minus blue | | Fog |
|---|---|---|---|---|---|
| | Speed | Gamma | Speed | Gamma | |
| None | 103 | 1.43 | 647 | 1.39 | .04 |
| 2.5 | 242 | 1.20 | 655 | 1.28 | .05 |

Some of the aromatic aldehydes, while effecting an increase of sensitivity (speed) in some spectral region, cause a decrease in others, and must be employed with this fact in mind. The minus blue speeds, in the above examples, demonstrates whether or not there is a loss of total spectral sensitivity owing to a decrease of speed in some spectral region.

Our invention is primarily directed to the customarily employed gelatino-silver-halide developing-out emulsions, such as gelatino-silver-chloride, gelatino-silver-chlorobromide, gelatino-silver-bromide and gelatino-silver-bromiodide developing-out emulsions, especially emulsions for development to black-and-white images by means of non-color-forming developers, i. e. developers devoid of —NH₂ groups, e. g. hydroquinone-N-methyl-p-aminophenol developers. Emulsions prepared in accordance with our invention can be coated in the usual manner upon any desired support such as cellulose nitrate support, cellulose acetate support, polyvinyl acetal support, metal support or paper support.

What we claim as our invention and desire to be secured by Letters Patent of the United States is:

1. A photographic silver halide emulsion spectrally sensitized with a sensitizing cyanine dye, said emulsion containing, as a supersensitizer, an aromatic aldehyde selected from the group consisting of o-hydroxy benzaldehydes and non-ionic alkoxy aromatic aldehydes represented by the following general formula:

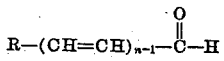

wherein $n$ represents a positive integer of from 1 to 2 and R represents an aromatic nucleus carrying at least one alkoxy group on the nucleus.

2. A process for preparing a sensitized photographic silver halide emulsion comprising incorporating in a photographic silver halide emulsion a sensitizing cyanine dye, and also incorporating in the emulsion an aromatic aldehyde selected from the group consisting of o-hydroxy benzaldehydes and non-ionic alkoxy aromatic aldehydes represented by the following general formula:

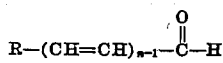

wherein $n$ represents a positive integer of from 1 to 2 and R represents an aromatic nucleus carrying at least one alkoxy group on the nucleus.

3. A photographic gelatino-silver-halide developing-out emulsion spectrally sensitized with a sensitizing cyanine dye, said emulsion containing, as a supersensitizer, an aromatic aldehyde selected from the group consisting of o-hydroxy benzaldehydes and non-ionic alkoxy aromatic aldehydes represented by the following general formula:

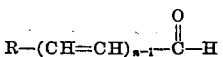

wherein $n$ represents a positive integer of from 1 to 2 and R represents an aromatic nucleus carrying at least one alkoxy group on the nucleus.

4. A process for preparing a sensitized photographic gelatino-silver-halide developing-out emulsion comprising incorporating in a photographic gelatino-silver-halide developing-out emulsion a sensitizing cyanine dye, and also incorporating in the emulsion an aromatic aldehyde selected from the group consisting of o-hydroxy benzaldehydes and non-ionic alkoxy aromatic aldehydes represented by the following general formula:

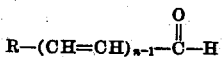

wherein $n$ represents a positive integer of from 1 to 2 and R represents an aromatic nucleus carrying at least one alkoxy group on the nucleus.

5. A photographic gelatino-silver-halide developing-out emulsion spectrally sensitized with a sensitizing cyanine dye, said emulsion containing, as a supersensitizer, a non-ionic alkoxy aromatic aldehyde selected from those represented by the following general formula:

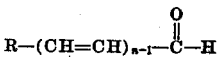

wherein $n$ represents a positive integer of from 1 to 2 and R represents an aromatic nucleus of the benzene series carrying at least one alkoxy group on the nucleus.

6. A process for preparing a sensitized photographic gelatino-silver-halide developing-out emulsion comprising incorporating in a photographic silver halide emulsion a sensitizing cyanine dye, and also incorporating in the emulsion a non-ionic alkoxy aromatic aldehyde selected from those represented by the following general formula:

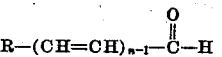

wherein $n$ represents a positive integer of from 1 to 2 and R represents an aromatic nucleus of the benzene series carrying at least one alkoxy group on the nucleus.

7. A photographic silver halide emulsion for development to black-and-white images spectrally sensitized with a sensitizing cyanine dye, said emulsion containing as a supersensitizer, an o-hydroxy benzaldehyde.

8. A photographic gelatino-silver-halide developing-out emulsion for development to black-and-white images spectrally sensitized with a sensitizing cyanine dye, said emulsion containing, as a supersensitizer, salicyl aldehyde.

9. A photographic gelatino-silver-halide developing-out emulsion spectrally sensitized with a cyanine dye which produces a maximum of spectral sensitivity in the emulsion at one concentration and at a higher concentration or upon digestion of the emulsion containing the dye at the lower concentration, produces a second maximum of spectral sensitivity at a wavelength longer than that at the first maximum, said emulsion containing as a supersensitizer a non-ionic alkoxy aromatic aldehyde selected from those which are represented by the following general formula:

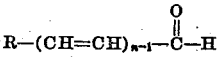

wherein $n$ represents a positive integer of from 1 to 2 and R represents an aromatic nucleus of the benzene series carrying at least one alkoxy group on the nucleus.

10. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye at the lower concentration, produces a second maximum of spectral sensitivity at a wavelength longer than that of the first maximum, said emulsion containing, as a supersensitizer, a non-ionic alkoxy aromatic aldehyde selected from those which are represented by the following general formula:

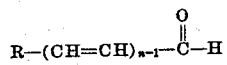

wherein $n$ represents a positive integer of from 1 to 2 and R represents an aromatic nucleus of the benzene series carrying at least one alkoxy group on the nucleus, said aldehyde giving an optically homogeneous gel with gelatin at a concentration of from about 7 to about 20 grams of aldehyde per 100 grams of gelatin.

11. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, a non-ionic alkoxy aromatic aldehyde selected from those which are represented by the following general formula:

wherein R represents an aromatic nucleus of the benzene series carrying at least one alkoxy group on the nucleus.

12. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, a non-ionic alkoxy aromatic aldehyde selected from those which are represented by the following general formula:

wherein R represents an aromatic nucleus of the benzene series carrying at least one alkoxy group on the nucleus.

13. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, o-methoxybenzaldehyde.

14. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, o-methoxybenzaldehyde.

15. A photographic gelatino-silver-halide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, 3,5-dimethoxybenzaldehyde.

16. A photographic gelatino-silver-bromiodide developing-out emulsion spectrally sensitized with a cyanine dye which produces a maximum of spectral sensitivity in the emulsion at one concentration and at a higher concentration, or upon digestion of the emulsion containing the dye in the lower concentration, produces a second maximum of spectral sensitivity at a wavelength longer than that of the first maximum, said emulsion containing, as a supersensitizer, 3,5-dimethoxybenzaldehyde.

BURT H. CARROLL.
JOHN SPENCE.